(12) United States Patent
Hotelling et al.

(10) Patent No.: US 7,464,590 B1
(45) Date of Patent: Dec. 16, 2008

(54) DIGITALLY PROGRAMMABLE BANDWIDTH FOR VIBRATORY RATE GYROSCOPE

(75) Inventors: Steven Porter Hotelling, San Jose, CA (US); Brian R. Land, Redwood City, CA (US); Lex Neal Bayer, Palo Alto, CA (US)

(73) Assignee: Thomson Licensing, Boulogne, Billancourt (FR)

( * ) Notice: Subject to any disclaimer, the term of this patent is extended or adjusted under 35 U.S.C. 154(b) by 0 days.

(21) Appl. No.: 11/077,040

(22) Filed: Mar. 10, 2005

Related U.S. Application Data

(60) Provisional application No. 60/552,652, filed on Mar. 12, 2004.

(51) Int. Cl.
*G01P 9/04* (2006.01)
(52) U.S. Cl. .................................. 73/504.12; 702/145
(58) Field of Classification Search ............... 73/504.12; 702/145
See application file for complete search history.

(56) References Cited

U.S. PATENT DOCUMENTS 5,237,871 A    8/1993    Henderson et al. ............ 73/493
5,987,984 A *  11/1999   Artzner et al. ............ 73/504.13
6,276,204 B1   8/2001    Townsend ................ 73/504.12

* cited by examiner

*Primary Examiner*—John E Chapman
(74) *Attorney, Agent, or Firm*—Joseph J. Laks; Vincent E. Duffy

(57) ABSTRACT

A signal-processing circuit for a dual-axis vibratory rotation-rate sensor has a digitally programmable bandwidth. An analog-to-digital converter (ADC) converts analog sense signals to digital signals at a high sampling rate. The results of successive ADC conversions are accumulated for a user-programmable number of conversions. By accumulating a number of samples, the sense signals are averaged which improves the signal-to-noise ratio and smoothes the output signal. Alternatively, accumulating a smaller number of samples allows the user to improve the response time of the sensor, allowing the user to set the number of samples that are averaged enables the user to control the effective bandwidth of the sensor. The accumulated conversions are also are scaled by unit-specific calibration factors in order to accommodate for unit to unit variations, so that the rate output will be consistent across a number of sensors.

14 Claims, 7 Drawing Sheets

US 7,464,590 B1

DIGITALLY PROGRAMMABLE BANDWIDTH FOR VIBRATORY RATE GYROSCOPE

REFERENCE TO RELATED PROVISIONAL APPLICATION

This application claims priority from provisional application No. 60/552,652, entitled "Dual Axis Vibratory Rate Gyroscope" filed on Mar. 12, 2004.

FIELD OF THE INVENTION

The present invention relates to the field of rotational rate sensors that include vibrating resonators.

BACKGROUND OF THE INVENTION

Rotational rate sensors with vibrating resonators, also referred to as vibratory-rate gyroscopes, measure rotational rates directly by sensing forces generated by the vibrating elements in response to rotation of the sensor. Various configurations of vibratory elements have been developed for use in vibratory-rate gyroscopes, including suspended tuning-fork structures, vibrating beams and vibrating rings. These elements are driven on resonance and the motion of the elements in response to rotation is measured to determine the forces on the elements and the rotation of the sensor.

An illustrative vibratory-rate gyroscope having a tuning fork element is taught in U.S. Pat. No. 5,698,784, Vibratory Rate Gyroscope and Methods of Assembly and Operation, issued to Steven P. Hotelling and Brian R. Land, Dec. 16, 1997. The Hotelling-Land gyroscope utilizes two vibratory elements, one to detect motion about each of two different rotational axes. However, not only does this design require the use of two tuning forks, the two tuning forks must operate at different frequencies in order to minimize crosstalk between the units. From a perspective of complexity and compactness, it is desirable to have a gyroscope capable of sensing rotation about two axes that requires only one vibrating element.

One difficulty with vibratory rate sensors arises from the fact that the driven vibratory motion is very large compared to the forces and motion resulting from rotation. Small amounts of mechanical transducer misalignment can result in the large driven motion causing errors in the small signals being sensed on the other axes. These errors are typically corrected mechanically, by adjusting sensors and/or by trimming material from the vibrating elements However, such mechanical trimming and adjustment is time consuming and expensive. It is desirable to provide automatic error correction electronically and to further provide correction that compensates over a wide variation in operating conditions.

It is also desirable to provide a rotational rate sensor that is small, inexpensive to produce, is adaptable to a wide range of applications, and is easily integrated with miocroelectronics. Such adaptability would preferably include the ability to adjust the bandwidth of the sensor and to provide for uniform output from a number of sensors. The present invention is directed to providing these advantages.

SUMMARY OF THE INVENTION

The preferred embodiment of the present invention comprises a bandwidth and scaling circuit for a dual-axis vibratory rotation-rate sensor. A user programmable digital accumulator allows for flexibility in determining the bandwidth (response time) of the sensor outputs and an integrated scaler provides for matching the responses of a number of sensors.

DETAILED DESCRIPTION OF THE PREFERRED EMBODIMENT

The characteristics and advantages of the present invention will become apparent from the following description, given by way of example of an exemplary rotational-rate sensor according to the principles of the present invention.

Figure 1:
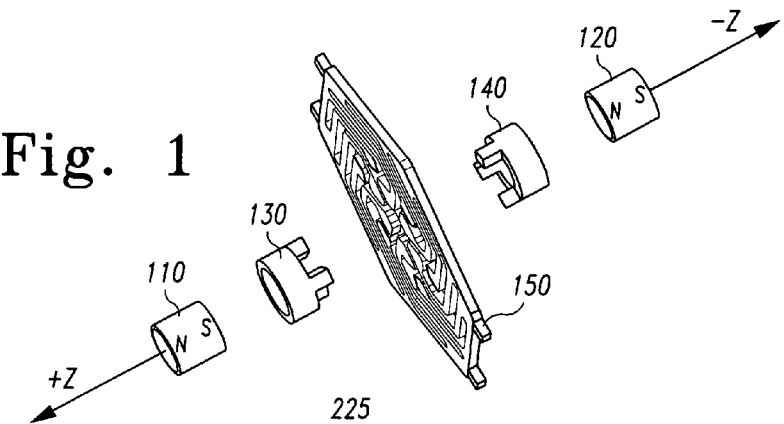
FIG. 1 an exploded view of vibratory assembly 100.

FIG. 1 is an exploded view of vibratory assembly 100, which includes cylindrical permanent magnets 110 and 120, magnet holders 130 and 140, and a planar beam structure 150. Magnets 110 and 120 are preferably aligned as illustrated, with poles oriented in a common direction, so that their magnet fields reinforce each other.

Figure 2:
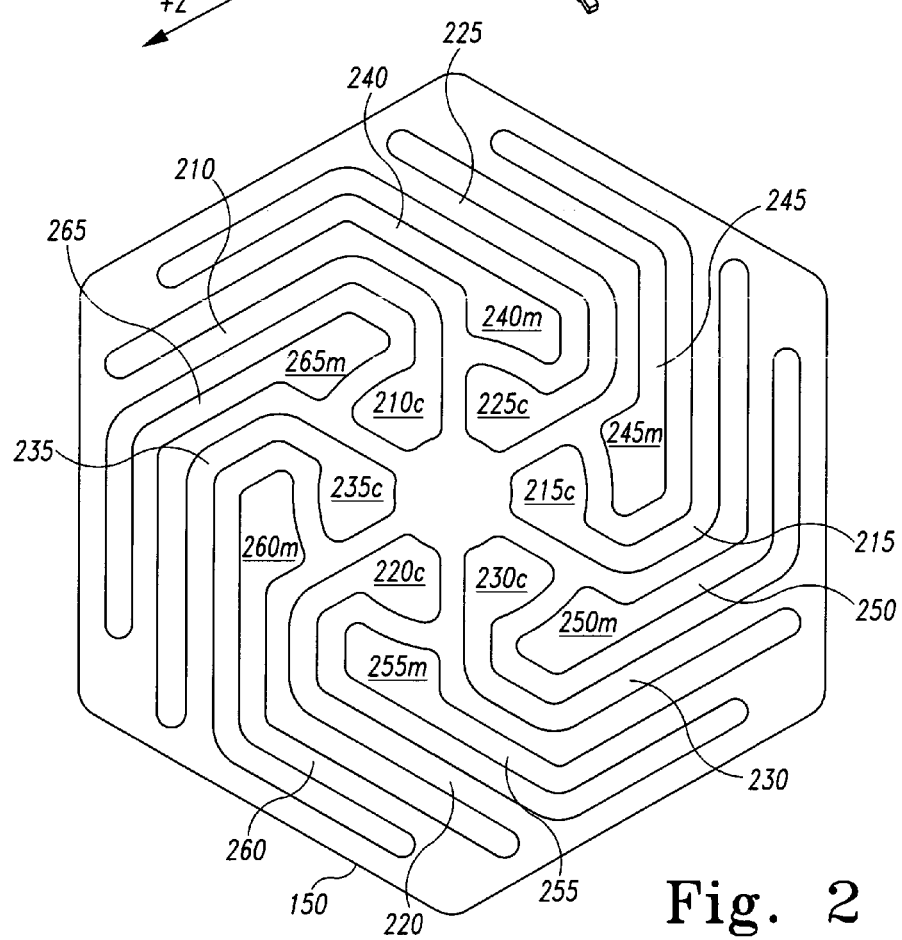
FIG. 2 is an illustration of a top view of beam element 150.

A top view of beam structure 150 is provided in FIG. 2. Beam structure 150 has an axially symmetric hexagon shape and is composed of several winding serpentine beams symmetrically folded about the z-axis. Beams 210-265 operate as spring arms to provide restoring forces in vibratory assembly 100. Contacts 210c-235c on the ends of the beams provide mounting locations the two magnet holders 130 and 140. Mounting points 240m-265m provide locations for fixing to an external assembly.

Figure 3:
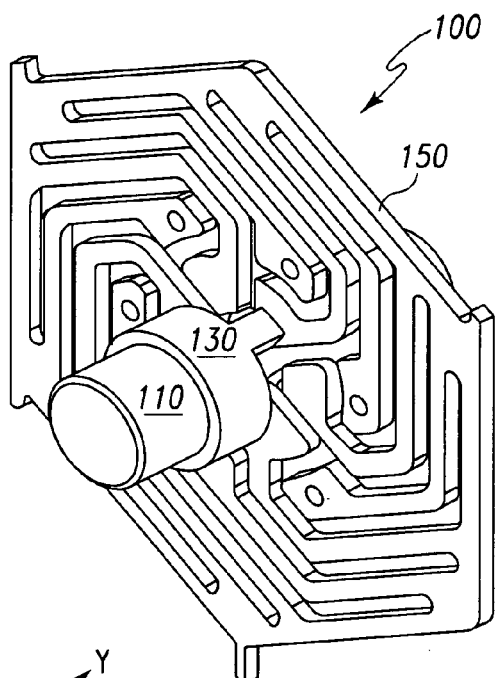
FIG. 3 illustrates an assembled vibratory assembly.

Referring now to FIGS. 1-3, three serpentine beams 210, 215 and 220 are connected to magnet holder 130 at contacts 210c, 215c and 220c. Magnet holder 140 is connected in a similar fashion to three interleaved beam ends 225c, 230c and 235c on the opposite side of beam structure 150. This mounting, and the relief in magnet holders 130 and 140, allows magnet holders 130 and 140 to move freely with respect to each other both in and out of the plane of beam structure 150. Specifically, magnet holders 130 and 140 can move towards each other along the z-axis without interference for a distance sufficient for the operation of vibratory assembly 100.

Magnet holders 130 and 140 are formed from a non-magnetic material, such as certain stainless steels, and are attached to beam structure 150. Magnets 110 and 120 are fixed inside magnet holders 130 and 140. The remaining 6 serpentine beams are mounted to an external assembly at mounting points 240m, 245m, 250m, 255m, 260m and 265m.

Figure 4:
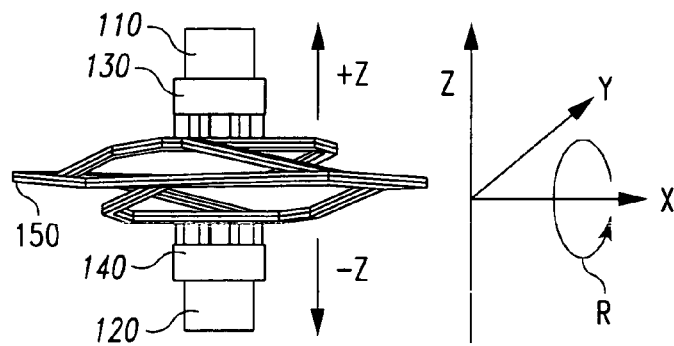
FIG. 4 is a side view of vibratory assembly 100 illustrating counter-phase motion.

In operation, magnets 110 and 120 are driven into a counter-phase motion along the z-axis as illustrated in FIG. 4. Counter-phase motion is a forced-resonant sinusoidal motion along the z-axis wherein magnets 110 and 120 sequentially move apart, then together, along the z-axis.

In general, vibratory rotational-rate sensors measure the rate of rotation of the sensor by sensing the force exerted on a mass moving in a linear direction within the rotating frame-of-reference of the sensor. This force is commonly referred to as the Coriolis force, and is described by the equation:

$$F_{Coriolis} = -2\,m(\omega \times v) \quad \text{(Equation 1)}$$

Where m is the mass of the moving object, v is the velocity vector of the moving object, and $\omega$ is the angular rate of rotation of the system.

When vibratory assembly 100 is rotated about the x or y axis (or about any axis in the x-y plane), a force is exerted on magnets 110 and 120 in a direction orthogonal to both the axis of rotation and the axis of vibration, as given in Equation 1. This force is proportional to angular rate of rotation $\omega$ and results in movement of magnets 110 and 120 in the x-y plane. This motion is detected to resolve the rotational rates about the x and y-axes. More specifically, referring to the coordinate system in FIG. 4, the axis of forced counter-phase vibration is the z-axis. When magnet 110 moves in the +z direction as shown, forces are produced on the moving magnets 110 and 120 when vibratory assembly 100 is rotated about either the x or y-axis. If vibratory assembly 100 is rotated about the x-axis in the direction R shown in FIG. 4, the angular rate $\omega$ will be a vector along the +x axis. This results in a force on magnet 110 in the +y direction (according to the right hand rule), and movement of magnet 110 in the +y direction. A similar analysis resolves the forces on magnet 120 as it moves (simultaneously) in the z direction. As vibratory assembly 100 rotates about the x-axis in the direction R shown in FIG. 4, the force on magnet 120 is in the −y direction, resulting in movement of magnet 120 in the y direction.

Figure 5:
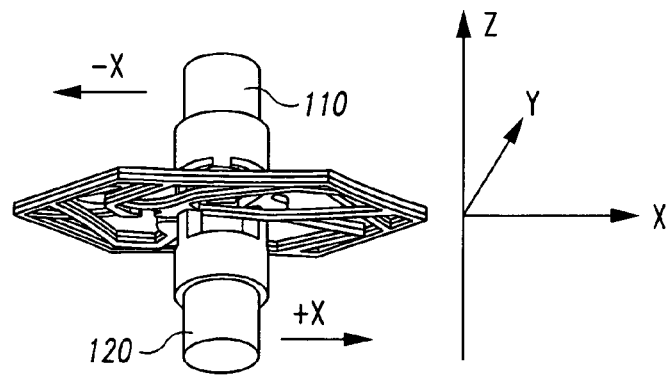
FIG. 5 is a perspective drawings illustrating the motion of vibratory assembly 100 in response to rotation about the x and/or y axes. This motion is referred to as the sense mode.

As illustrated in FIG. 5, rotation of vibratory assembly 100 about the y-axis results in motion of magnets 110 and 120 parallel to the x-axis and the amplitude of this motion is sensed to provide a measurement of the rate of rotation about the y-axis. Specifically, magnets 110 and 120 are illustrated as having a component of motion parallel to, or along, the x-axis, which corresponds to a rotation of the sensor about the y-axis. Motion of magnets and 110 and 120 in the x-y plane is referred to as sense motion, since motion in the x-y plane is sensed in order to measure the rotational rates of the vibratory assembly 100.

As discussed above and illustrated in FIG. 4, to establish the required resonant counter-phase motion of vibratory assembly 100, magnet 110 is driven along the z-axis at the resonant frequency of the counter-phase mode of 1800 Hz. The amplitude of this motion is about 50 microns peak-to-peak and the resonance is characterized by a quality factor Q of about 2000. The high Q, which is an indication that the system loses only a small fraction of its energy over time, and the matching of the drive frequency to the resonance of the vibratory assembly allow the counter-phase motion to be driven with a relatively small forcing input.

Magnet 120 acquires a symmetrical sympathetic motion in response to the motion of magnet 110. The motion of the non-driven magnet 120 in the x-y plane is sensed to detect the rotation of vibratory assembly 100 about the x and y-axes. Alternatively, the same magnet or mass could both driven and sensed by using appropriate time sequencing. However, the preferred embodiment allows for more design in the placement of the drive and sense functions.

Referring again to FIG. 2, beam structure 150 provides the restoring forces required to establish the desired resonant frequencies of vibratory structure 100. It also is designed to provide for radial symmetry in the x-y plane, such that magnets 110 and 120 move symmetrically in the x-y plane in response to rotation. Specially, beam structure 150 is 6-fold axially symmetric. That is, if beam structure 150 is divided into 6-sixty degree segments, the segments are identical, and they remain identical with rotation. This symmetrical design minimizes drive trajectory misalignment errors, cross-axis errors, and facilitates equal movement of the magnets in any direction in the x-y plane.

Six serpentine beams 210, 215, 220, 225, 230 and 235 couple to the magnet/magnet holder pairs at contacts 210c, 215c, 220c, 225c, 230c and 260c. These beams provide a restoring force that establishes a counter-mode resonance of about 1800 Hz. The serpentine shapes of the beams allow for the longer beam lengths required to lower the resonant frequency to the desired 1800 Hz in a compact design.

Figure 6:
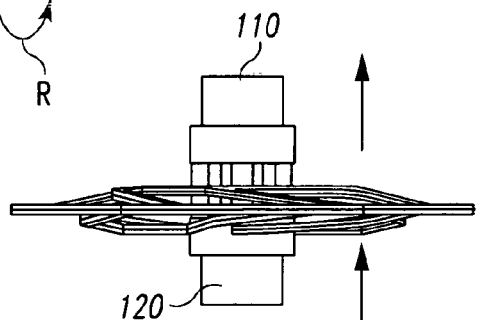
FIG. 6 is a side view illustrating the motion of vibratory assembly 100 in the in-phase mode.

Beam structure 150 also includes design features that reduce undesirable modes of oscillation. More specifically, the design minimizes the in-phase mode of vibration illustrated in FIG. 6. In the in-phase mode, magnets 110 and 120 both move in the +z direction, then both move in the z direction. This mode of operation is undesirable because it couples unbalanced forces in and out of vibratory assembly 100 at mounting points 240m-265m. The in-phase mode is minimized by designing beam structure 150 such that the resonant frequency of the in-phase mode is well separated from the counter-phase resonance. This is accomplished by the proper choice of beam lengths for the six beams 240-265 which couple beam structure 150 to an external assembly at mounting points 240m-265m. These beams are minimally involved in the counter-phase mode but are involved in the in-phase mode, in a manner analogous to the involvement of the handle on a tuning fork when the arms of the tuning fork move in phase. Lengthening these 6 beams lowers the resonant frequency of the in-phase mode, which reduces the energy coupled between the in-phase mode and the driving frequency, which is picked to coincide with the desired counter-phase mode. The lengths of beams 240-265 have been chosen to result in an in-phase resonant frequency of 1400 Hz, well below the drive frequency. This separation of greater than 20% is more than sufficient to allow filters to eliminate in-phase frequencies.

Beam structure 150 has a planar, single-element design that lends itself to easy manufacturing and has a number of preferable mechanical characteristics. The planar beam-spring configuration can be easily manufactured by chemical etching, or by various semiconductor or micro-machine manufacturing techniques, or by etching, fine blanking, stamping or electro-discharge machining. Physical vapor deposition processes, such as sputtering, may also be used to produce the desired beam shapes. It is desirable that the material beam structure 150 maintain a constant modulus of elasticity over temperature so that the vibration frequency remains suitably constant over the operating temperature of the sensor. The material is preferably homogenous and suitable materials for beam element 150 include metals such as elinvar, stainless steel, beryllium copper, spring steel or other suitable alloys. Alternatively, quartz or silicon may be used and shaped through conventional photolithographic etching processes.

Other mechanisms could be developed to provide the restoring forces for certain embodiments of the present invention, however, the planar beam structure, and more particularly the serpentine beam structure with beam-springs of varying lengths, provides unique advantages to the preferred embodiment of the present invention, such as the extremely high-Q which is a result of the low-loss homogeneous design of beam structure 150.

Referring again to FIG. 5, the sense motion is responsive to the torques caused by rotation of vibratory assembly 100. The sense motion is a sinusoidal motion that is driven at the frequency of the counter-phase motion and has an amplitude proportional to both the rotational rate and the amplitude of the counter-phase motion. The natural resonant frequency of the sense motion, referred to as the sense mode, is chosen close to the drive frequency of the counter-phase mode. The natural resonant frequency of the sense mode is preferably close to the drive frequency of the counter-phase mode, about 1700 Hz in the preferred embodiment. Picking the sense mode resonance to be close to the frequency of the driven counter-phase motion magnifies the amount of sense motion, which is desired because of the very small magnitude of the motion to be sensed. This frequency is close enough to the drive frequency of the counter-phase motion to achieve a significant physical resonance magnification multiple of approximately 10. A higher magnification and sensitivity is possible if the sense mode resonance is chosen to be closer to or coincident with the frequency of the driven counter-phase motion. However, in the present design it was preferable to calibrate a number of sensors to respond identically to like inputs, thus a frequency was chosen wherein the slope of the magnification curve was small enough so that unit-to-unit variations could be more readily compensated. Beam structure 150 thus provides a restoring force for the desired counter-phase mode and permits vibrations in the plane orthogonal to the vibratory axis, (referred to as the sense motion) which are detected to indicate rotation of the assembly. Further, beam structure 150 establishes a high-Q resonance (Q is about 2000) for the counter-phase mode, and establishes the resonance of the sense mode close to the driven frequency of the counter-phase mode.

Figure 7:
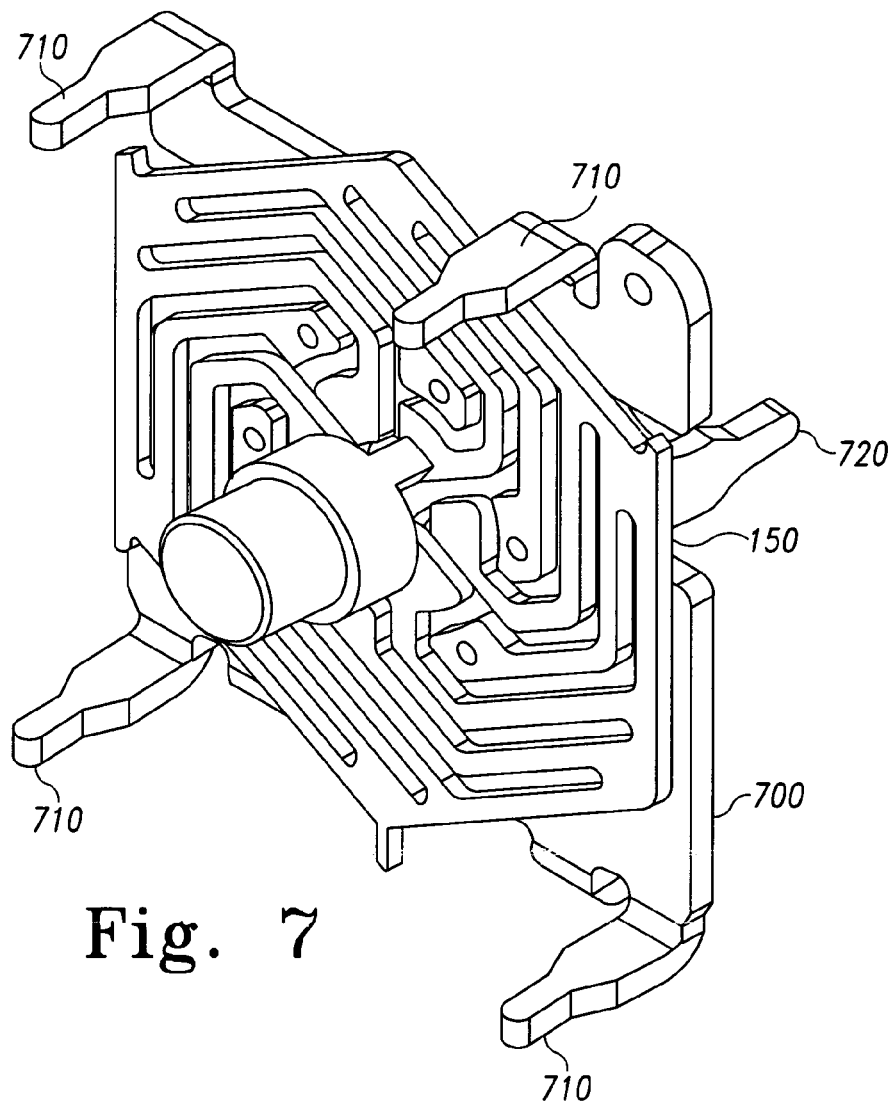
FIG. 7 is a perspective drawing of the vibratory assembly 100 mounted on mount plate 700.

FIG. 7 illustrates the beam element mounted to an external metallic mount plate 700. Beam structure 150 is attached to mount plate 700 by fastening mounting points 240m-265m (See FIG. 2) of the 6 serpentine beams 240-265 to raised protrusions on mount plate 700. These protrusions (not shown) are formed as semi-piercings in mount plate 700 and hold beam structure 150 approximately 0.23 mm from mount plate 700 so that all beams of beam structure 150 can vibrate freely.

Figure 8:
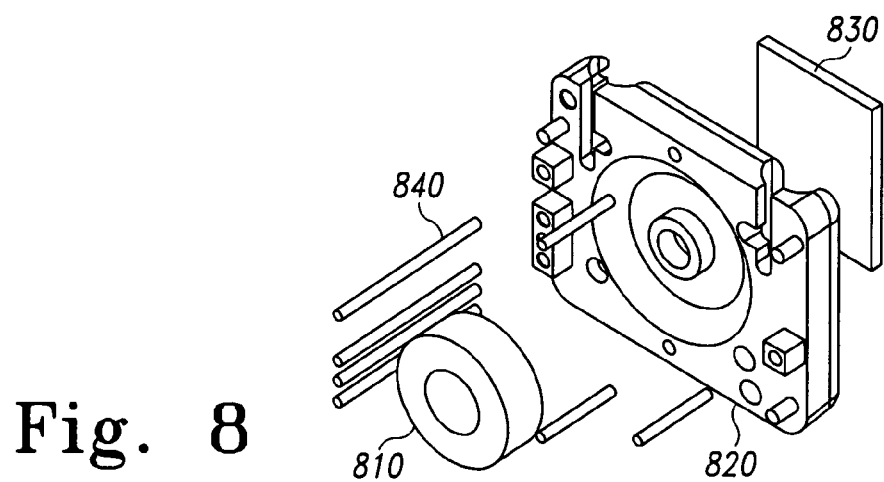
FIG. 8 is a perspective drawing of drive side assembly 800 in an exploded view.

FIG. 8 illustrates drive side assembly 800 in an exploded view. Drive side assembly 800 locates drive coil 810 proximate to magnet 110 and magnet holder 130 (illustrated in previous FIGS. 1, 3-7) and includes a plastic drive mold 820, which incorporates a location feature for drive coil 810. A magnetically permeable iron plate 830 is attached to the rear of drive mold 820 to help channel the magnetic flux lines generated by magnet 110 and to improve the coupling between drive coil 810 and magnet 110. Plate 830 also provides additional inertia to the system to reduce unwanted motion. Pins 840 are attached to drive mold 820 and carry electrical signals to and from drive side assembly 800

Figure 9:
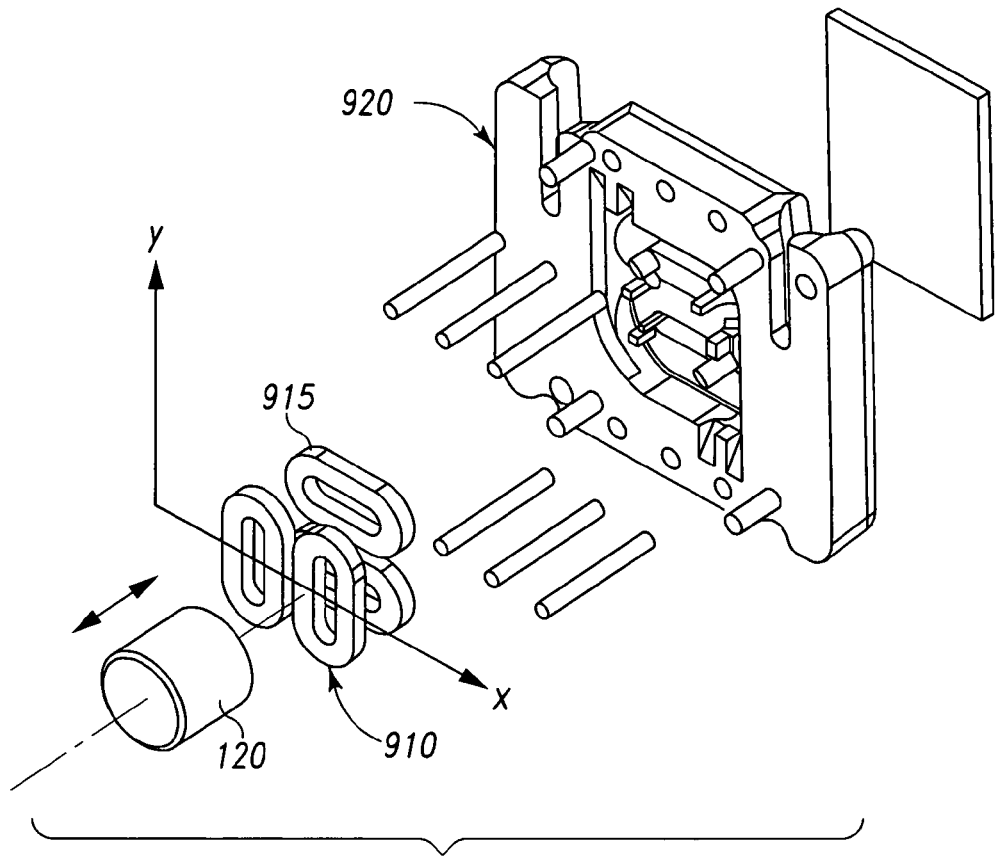
FIG. 9 is a perspective drawing of sense side assembly 900 in exploded view.

FIG. 9 illustrates a sense side assembly 900 in an exploded view. Sense side assembly 900 is mounted proximate to magnet 120 on the side of beam structure 150 opposite drive assembly 800. Two pairs of sense coils 910 and 915 are attached to sense mold 920. The two pairs of flat, oval, sense coils are oriented 90 degrees apart and, when completely assembled, are located in close proximity to magnet 130. Coils 910 and 915 coils are each mounted in the x-y plane and are used to detect motion of magnet 120 in the x-y plane, one pair sensing motion along the x-axis, the other pair sensing motion along the y-axis. Specifically, with reference to the x-y axis illustrated in FIG. 9, sense coils 910 are oriented such that motion magnet 120 along the x-axis will generally increase the flux in one coil, and decrease the flux in the other, signal corresponding to the x position of magnet 120. The oval shape of the coils makes them more sensitive to motion in the x-direction. Each coil pair is connected with opposite polarity (wound in opposite directions) so that flux changes resulting from the driven z-axis motion of magnet 120 generally cancel out, but motions along the x-axis will be additive.

Figure 10:
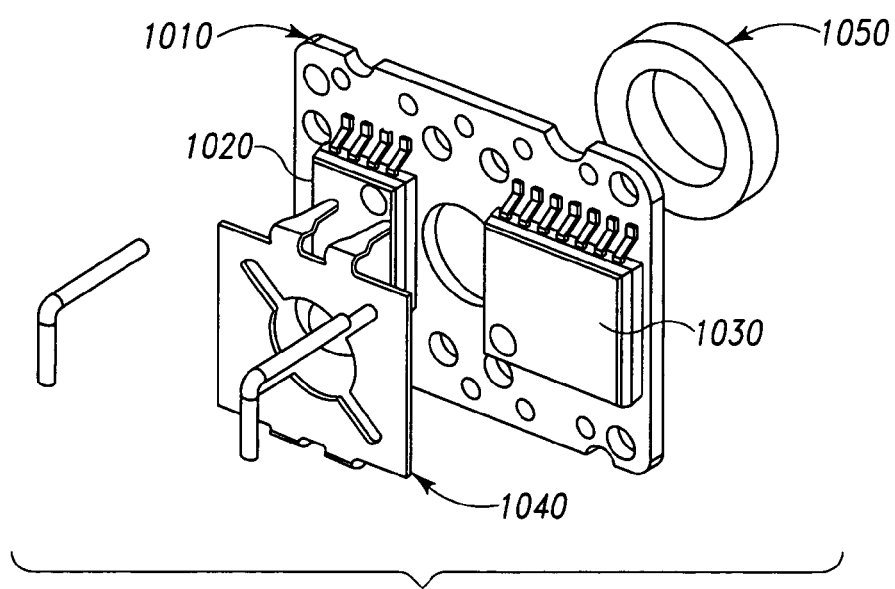
FIG. 10 is an exploded view of signal PCB 1010.

FIG. 10 is an exploded view of signal printed circuit board (PCB) 1010. Attached to signal PCB 1010 are Electronically Erasable Programmable Read Only Memory (EEPROM) 1020 and Application Specific Integrated Circuit (ASIC) 1030. A capacitive shield plate 1040 is attached to signal PCB 1010 and prevents capacitive coupling between sense coils 910 and 915 and the various traces and pins on signal PCB 1010. Capacitive shield plate 1040 is a made from an electrically conducting and non-magnetic material such as phosphor bronze. AGC coil 1050 is attached to the back side of signal PCB 1010. As described in more detail below, AGC coil 1050 senses the amplitude and precise phase of the driven counter-phase motion along the z-axis and provides feedback for the drive, error correction and signal demodulation circuitry. Coils 810, 910, 915 and 1050 are manufactured by winding insulated electrically conductive wire, such as copper, around a spindle which is later removed. The coils can also be formed by spiraling traces on several PCB layers to generate a coil structure or by depositing metal films onto a substrate and then etching coil turns with photolithographic methods. One advantage of the present design is that it is amenable to the use of flat coils, which are inexpensive and easily manufactured. Alternatively, other types of transducers could be used for driving and sensing the vibratory motion.

Figure 11:
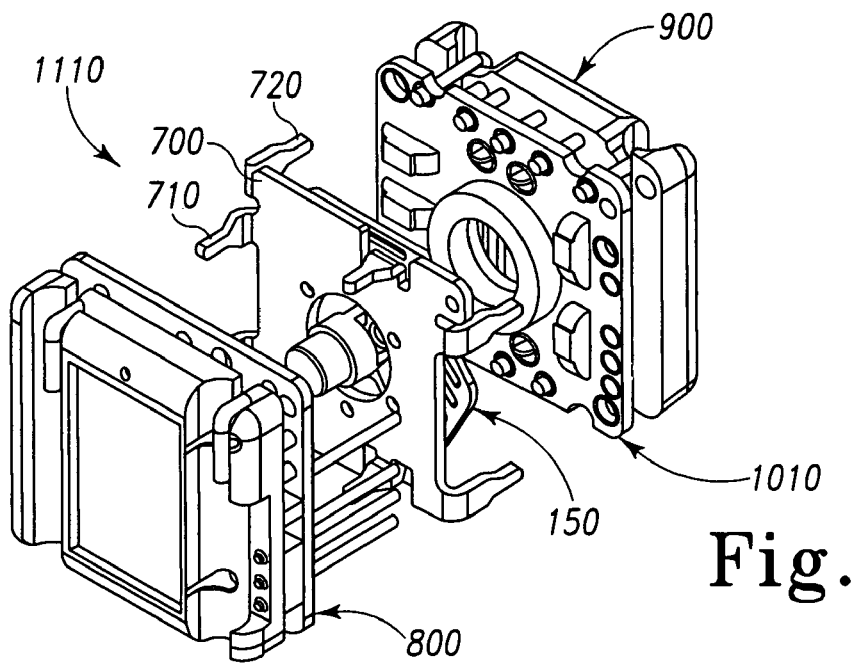
FIG. 11 is an exploded view of the suspended assembly 1110.

FIG. 11 is an exploded view of suspended assembly 1110. Drive side assembly 800 is attached to mount plate 700 via tangs 710. Mount plate 700 is further attached to sense side assembly 900 via tangs 720. The resulting compact integrated assembly positions drive coil 810 in close proximity to magnet 110; and AGC coil 1050 and sense coils 910 and 915 are positioned in close proximity to magnet 120. The various cross connecting pins are connected (soldered) into signal PCB 1010 to establish electrical routes through suspended assembly 1110.

Figure 12:
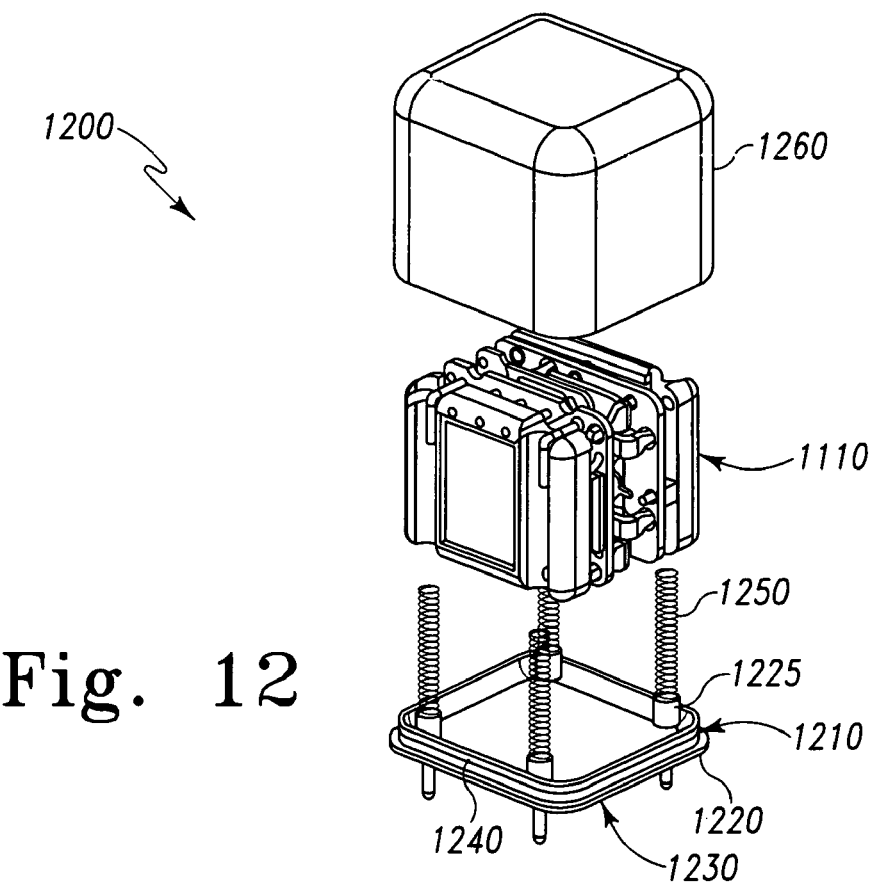
FIG. 12 is an exploded view of final assembly 1200.

FIG. 12 is an exploded view of final assembly 1200. Base assembly 1210 consists of a plastic injection molded part, base mold 1220, which has 4 pins 1225 attached to it. Conducting metallic belly plate 1230 is attached to base mold 1220. Gasket 1240, molded out of silicon rubber, is inserted between base mold 1220 and belly plate 1230 as shown. Four helical springs 1250 are connected to pins 1225. Helical springs 1250 are made from electrically conducting material that is wound into a helical spiral shape. Suspended assembly 1110 is positioned onto 4 helical springs 1250, and attached by soldered, welding, brazing or mechanical fastening.

Helical springs 1250 perform two functions. First, the four conductive springs are used to pass electrical signals between signal PCB 1010 and base mold 1220. Further, springs 1250 provide vibratory isolation between suspended assembly 1110 and base mold 1220. This isolation prevents unwanted vibrations (linear acceleration, mass mismatch effects) from being coupled to vibratory assembly 100. Lastly, can 1260 is then attached to belly plate 1230 to form a closed container to shield the sensor from undesired interference sources. Gasket 1240 forms a seal against the can so as to prevent moisture from entering the assembly.

Figure 13:
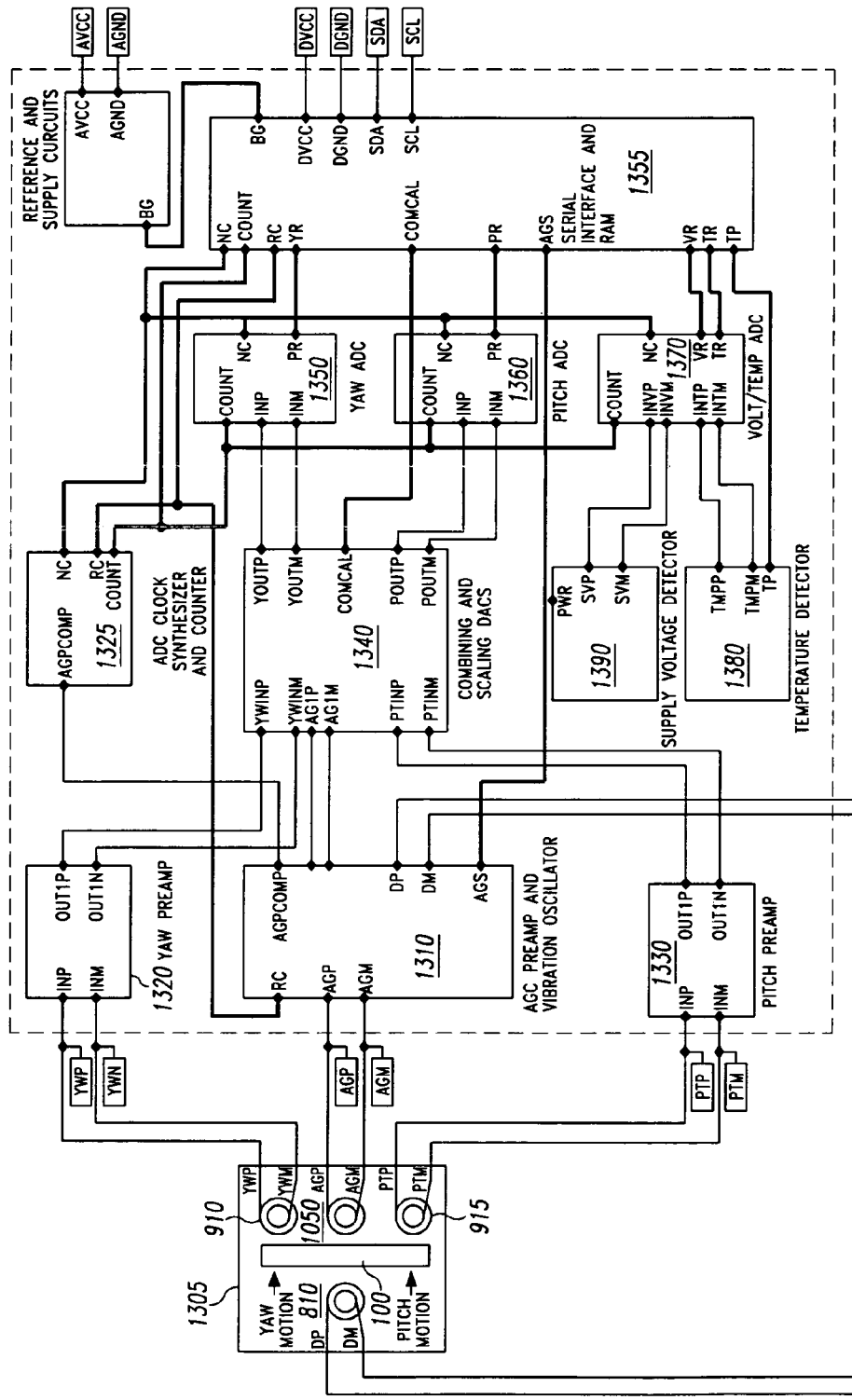
FIG. 13 is a logical schematic diagram of ASIC 1030.

Referring now to FIG. 13, ASIC 1030 performs signal processing for the rotational rate sensor. EEPROM 1020 stores various calibration factors and other data used by ASIC 1030. FIG. 13 is a logical schematic of the system electronics of ASIC 1030.

Coils 810, 910, 915 and 1050 in final assembly 1200 are illustrated in transducer section 1305. Vibratory assembly 100 is driven at its natural resonant frequency by applying an alternating drive current (DP-DM) to drive coil 810. This produces a sinusoidal motion in vibratory assembly 100 along the z-axis, which is sensed by AGC coil 1050. AGC coil 1050 produces a sinusoidal AGC signal (AGP-AGM) having an amplitude scaled to provide the desired physical amplitude of vibration of vibratory assembly 100 along the z-axis. The frequency and phase of the drive current is adjusted to coincide with the frequency of vibratory assembly 100 in the counter-phase mode so as to maximize the driven motion. Yaw motion (about the x-axis) is detected by sense coils 910, which produces yaw signal. (YWP-YWM) Similarly, pitch motion (about the y-axis) is detected by sense coils 915, which produces pitch signal (PWP-PWM).

Yaw and Pitch preamps 1320 and 1330 and the AGC preamp portion of AGC preamp and vibration oscillator 1310 convert the low-level voltage signals from coils 910, 915 and 1050 to differential currents utilizing on-chip conversion resistors. These preamps have minimal phase-delay characteristics, which preserves the precise phase relationships between yaw, pitch and AGC signals used by ASIC 1030. Alternatively, the phase characteristics could be matched. In either case, the phase relationships between the signals are precisely preserved.

Differential analog AGC signal (AGP-AGM) is coupled to AGC preamp and vibration oscillator 1310. A vibration oscillator portion of AGC preamp and vibration oscillator 1310 drives vibratory assembly 100 at its resonant frequency by applying drive current (DP-DM) to drive coil 810 using phase and amplitude feedback from AGC signal (AGP-AGM) from AGC coil 1050. AGC signal (AGP-AGM) is integrated over each half-cycle and the result is compared with a voltage reference derived from temperature-compensated band gap reference (BG) and the difference is used to create the appropriate magnitude slew-limited drive signal at the DP and DM outputs. Signal (DP-DM) has a generally square-wave like waveform and is nominally in-phase with the AGC signal. The analog differential AGC signal (AGP-AGM) is amplified and output to combining and scaling DACs 1340 as signals (AGIP-AGIM). A phase reference signal ADPCOMP is also provided to ADC Clock Synthesizer and Counter 1325 in response to zero crossings of the AGC signal.

Scaling and combining DACs 1340 condition analog yaw (YWP-YWM) and pitch (PWP-PYM) sense signals to provide for dc offset removal from the preamplifiers, to remove parasitic quadrature error signals, and to remove cross-axis errors to compensate for unit-to-unit variations so that the signals presented to the ADC blocks will be normalized with respect to unit-to-unit variations. DC offset and parasitic quadrature error signals are removed by analog addition of equal and opposite analog signals which are synthesized by programmable digital-to-analog converters (DACs) using calibration values stored in digital registers in serial interface and RAM 1355. Cross-axis errors are compensated for in a similar fashion but use the sense channel signals directly as a reference. It should be noted that the COMCAL bus line interconnecting scaling DACs 1340 and serial interface and RAM 1355 provides scaling DACs 1340 access to the PINPH, POFST, PCAX, PSF, YINPH, YOFST, YCAX and YSF registers of serial interface and RAM 1355. The use of these registers is discussed in further detail below.

Figure 14:
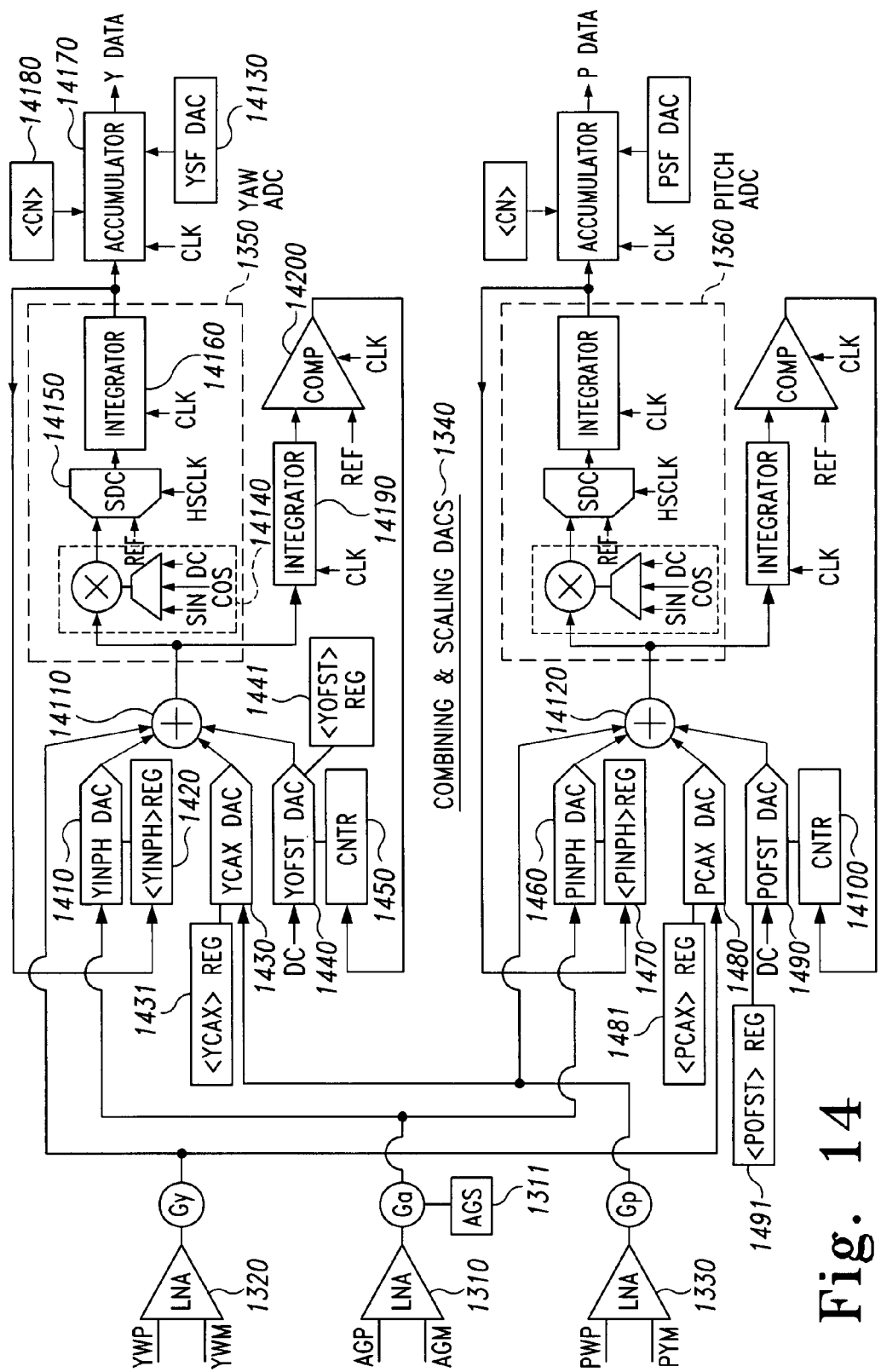
FIG. 14 is a detailed schematic of combining and scaling DACs 1340 and adjoining circuitry.

FIG. 14 is a detailed schematic of combining and scaling DACs 1340 and adjoining circuitry. The yaw input signal is the differential voltage across the yaw input pins YWP and YWM. The differential analog yaw signal (YWP-YWM) is a composite signal which includes the desired rate signal for the yaw rotation as well as unwanted error signals. Specifically;

$$V_{yaw} = V(YWP) - V(YWM) \quad \text{(Equation 2)}$$

The theoretical definition of the yaw signal, which describes the desired and error components, is:

$$VyawNOM = InphYaw * \text{SIN}(2\pi * Fvib * t) - \quad \text{(Equation 3)}$$
$$CrossYaw * RatePitch * \text{COS}(2\pi * Fvib * t) -$$
$$RateYaw + MROyaw) * YSF * \text{COS}(2\pi * Fvib * t)$$

The SIN term of this equation is an in-phase signal (relative to the AGC signal) which is an undesired error component resulting from transducer misalignment of the driven vibratory motion. InphYaw is defined as the amplitude of this in-phase yaw signal. This error is eliminated by adding an equal and opposite signal provided by YINPH DAC 1410 to the sensed yaw signal (YWP-YWM) at adder 14110. YINPH DAC 1410 scales its output with AGC signal (AGP-AGM), which is multiplied by the YINPH calibration parameter. By correcting the sense signal prior to digitization, and by using the analog AGC signal directly to preserve the phase relationship between the vibratory motion and the sense motion, the in-phase error component is greatly reduced.

The first COS term is an undesired error signal which comes from coupling between the yaw and pitch axes. CrossYaw is defined as the amplitude of this cross-axis (pitch) error signal. This cross-axis error is compensated for by adding an equal and opposite signal to the sensed yaw signal (YWP-YWM) at adder 14110. The correction signal is provided by YCAX DAC 1430, which scales its output with pitch signal (PWP-PYM), and is multiplied by the YCAX calibration parameter. By correcting the sense signal prior to digitization, and by using the analog pitch signal directly to preserve the phase relationship between the error source and the correction signal, the cross-axis error component is greatly reduced.

The second COS term contains the desired signal, which is modulated by yaw angular rate. This signal indicates the desired angular yaw rate motion of vibratory assembly 100. However, this term also includes an undesired mechanical rate offset (MROyaw) arising from alignment errors.

The operation of the pitch signal portion of combining and scaling DACs 1340 is similar to that described with reference to the yaw signal circuitry. Digital values in the DAC digital calibration registers provide the scaling factors for the DAC. Further descriptions of the errors compensated by each, the compensating signal source, the description of the error root cause, and the correspondence to the steady-state signal definition are more fully provided in Table I.

TABLE I

| DAC digital calibration registers | Description of error to be compensated | Compensating signal source | Description of error root cause | Reference to Steady-State Signal Definition |
|---|---|---|---|---|
| <YOFST> | Yaw DC offsets | DC current proportional to preamp biasing | Input offset voltages, current mirror tolerances in ASIC 1030 (input signal has negligible DC offset) | Not described in steady-state signal definition |
| <YINPH> | Yaw In phase error | AGC signal | Mechanical transducer misalignment | SIN term in Vyaw formula |
| <YCAX> | Yaw Cross axis | Pitch signal | Mechanical transducer misalignment and vibrating element sense principle vibration mode misalignment | First COS term in Vyaw formula |
| <YSF> | Yaw Scale Factor | Yaw signal after DC offset compensation, In phase compensation, and Cross axis compensation | Mismatch between raw scale factor at output and desired ADC full-scale conversion range | Second COS term in Vyaw formula |
| <POFST> | Pitch DC offsets | DC current proportional to preamp biasing | Input offset voltages, current mirror tolerances in ASIC 1030 (input signal has negligible DC offset) | Not described in steady-state signal definition |
| <PINPH> | Pitch In phase error | AGC signal | Mechanical transducer misalignment | SIN term in Vpitch formula |
| <PCAX> | Pitch Cross axis | Yaw signal | Mechanical transducer misalignment and vibrating element sense principle vibration mode misalignment | First COS term in Vpitch formula |
| <PSF> | Pitch Scale Factor | Pitch signal after DC offset compensation, In phase compensation, and Cross axis compensation | Mismatch between raw scale factor at output and desired ADC full-scale conversion range | Second COS term in Vpitch formula |

After the error signals are electronically removed by analog addition at adder 14110, desired yaw sense signal is demodulated at mixer 14140 with a cosine signal (in quadrature with the AGC signal) to demodulate the desired yaw signal and to further remove remaining undesired sine components. Mixer 14140 can further selectively demodulate the yaw sense signal with either a sine signal or a dc signal. These modes are used to determine calibration values, as described below.

Yaw analog-to-digital converter (ADC) 1350 and pitch ADC 1360 perform simultaneous analog-to-digital conversions which are synchronized relative to the AGC signal. Pitch ADC 1360 operates in a manner consistent with that of yaw ADC 1350, which we now describe. The corrected yaw signal is applied to mixer 14140, where it is demodulated by mixing with a cosine signal (in quadrature with the AGC signal). The demodulated signal is then rectified and converted to digital levels by yaw ADC 1350. In the preferred embodiment, yaw ADC 1350 utilizes a Sigma Delta Converter 14150 that samples the demodulated yaw signal at a high rate in response to HSCLK signal from ADC clock synthesizer and counter 1325 many times each cycle. Twice each 1.8 kHz cycle the rectified samples are integrated by integrator 14160 in synchronization with the CLK signal from ADC clock synthesizer and counter 1325. The CLK signal is derived directly from the AGC signal to retain precise phase relationship with the physical oscillator. This synchronized demodulation and conversion further improves signal-to-noise of the sense signals by further removing certain error signals.

The digital values applied to YINPH DAC 1410 and PINPH DAC 1460 are derived by auto-correction loops that perform sine demodulation of the sense channels and adjust the scaling YINPH DAC 1410 and PINPH DAC 1460 to minimize the amount of in-phase signal on each of the two sense channels. Specifically, a selectable in-phase trim mode selects the sine input to mixer 14140 and to demodulate the corrected yaw signal with a sine wave. The resulting sine-demodulated digital signal from yaw ADC 1350 establishes the value of the YINPH parameter, which is loaded into YINPH register 1420 and used to scale the YINPH DAC 1410 to remove sine error signals during normal operation. The PINPH auto-correction loop operates in a similar manner.

The digital values for YCAX DAC 1430 and PCAX DAC 1480 are derived from factory calibration procedures wherein the completed assembly is rotated and the amount of cross axis on the relative channels is measured. These digital values are then loaded into EEPROM 1020 and digital registers on ASIC 1030.

YOFST and POFST are correction signals for DC offset errors. The digital values for YOFST and POFST are also determined by auto-correction loops. The output from adder 14110 is applied to integrator 14190, which is synchronized to the CLK signal from ADC clock synthesizer and counter 1325 to integrate the output from adder 14110 over a set number of cycles of the AGC signal. The integrated value is compared to a reference value (nominally zero) in comparator 14200. The result is applied to counter 1450. This count adjusts the YOFST value stored in YOFST DAC 1440, which scales a DC signal applied to adder 14110 to provide DC error correction. The POFST loop operates in an identical manner. In operation, these loops will adjust the scaling of a YOFST and POFST to minimize the amount of DC signal on the sense channels.

The results of each ADC conversion from yaw ADC 1350 are accumulated in accumulator 14170. The number of accumulated conversions is set by a programmable register <CN> 14180. The conversions are averaged over a number of samples by accumulating (integrating) a number of samples. This improves the signal-to-noise ratio and smoothes the output signal. Alternatively, accumulating a small number of samples allows the user to improve the response time of the sensor. Thus, selecting the number of samples that are averaged enables control of the effective bandwidth of the sensor. The accumulated conversion results are periodically written into a set of RAM result registers.

The CN value also sets a level of pre-multiplication performed by accumulator 14170 on each sample before it is added to the accumulator in order to maximize the dynamic range of the output. The pre-multiplication scaling factor is increased for lower values of CN in order to report the maximum allowable resolution.

The output of accumulator 14170 is scaled by the value YSF in order to accommodate for unit-to-unit variations, so that the rate output will be consistent across all units. This is accomplished by scaling the output of accumulator 14170 with the value YSF stored in YSF register 14130. The digital value for YSF is derived from factory calibration procedures wherein the completed assembly is rotated and the output is measured. This digital value is then loaded into EEPROM 1020 and digital registers on ASIC 1030.

Referring now to FIG. 13, ADC clock synthesizer and counter 1325 receives the analog AGCCOMP signal from AGC preamp and vibration oscillator 1310, and provides the digital clock signals CLK and COUNT used to precisely synchronize the digital circuitry and sampling with the oscillations of the vibratory assembly. This is accomplished by using a high frequency oscillator which is divided down to a frequency matching the natural vibration frequency of vibratory assembly 100 and locked to a phase reference (such as the zero crossing point) of AGC signal AGPCOMP.

The CLK/COUNT signal is shifted 90 degrees in-phase from the AGCCOMP signal to facilitate extraction of the sense signal angular rate information. Thus, it is precisely synchronized with the physical vibration of vibration assembly 100. A high speed HSCLK signal is also provided, which is synchronized with the CLK signal and has a higher frequency. During calibration, the 90 degree phase shift is selectively deactivated in order to determine YINPH and PINPH calibration values.

ASIC 1030 and EEPROM 1020 communicate with an external microprocessor using a serial 2 wire interface, such as Philips' I2C interface, contained in serial interface and RAM block 1355. The 2 wire interface conserves the number of connections required between the external package and the suspended assembly. In fact, there are only four electrical connections to the suspended assembly. This enables the external microprocessor to read digital values from result registers and to write calibration values and status values into input registers.

During factory calibration, error signals are measured and the appropriate scaling factors stored in EEPROM 1020. During initialization of normal operation, an external microprocessor reads the stored calibration values from EEPROM 1020 and writes them to registers on ASIC 1030. ASIC 1030 uses these stored values to set the appropriate DAC levels used for performing the error corrections discussed above.

Values YINPH, PINPH, YOFST, POFST, YCAX, PCAX, YSF, PSSF, RCC, CN and AGS are stored in the <PINPH>, and <YINPH>, <POFST>, <YOFST>, <YCAX>, <PCAX>, <YSF>, <PSSF>, <RCC>, <CN>, <AGS> registers respectively. During factory calibration these register values are written by an external processor to EEPROM 1020 for permanent storage. On subsequent start-ups these values are re-loaded (seeded) into the registers on ASIC 1030 to minimize loop settling time. Values for RCC and AGC are seeded into registers associated with AGC preamp and vibration oscillator 1310. RCC is the time constant calibration used to adjust the oscillator center frequency to compensate for ASIC process variations. AGS, is the amplitude calibration value which scales the AGC signal prior to amplitude detection. Thus, altering the value of AGS changes the physical amplitude of the driven counter-phase motion. Seeding (preloading) these values in the active registers in ASIC 1030, which is on-board suspended assembly 1110, allows each sensor to be electronically calibrated and improves start-up time.

Digital and analog filtering is further performed throughout the circuitry in a conventional manner in order to remove the unwanted low and high-frequency components present on the signals. This circuitry is not illustrated.

ASIC 1030 further includes temperature sensor 1380 and voltage level detector 1390 which are fed through voltage/temperature ADC 1370 so that the temperature of the sensor, as well as the supply voltage can be reported. These values are made available to allow subsequent higher order error correction for temperature and voltage dependant phenomena.

While the present invention has been described with reference to the preferred embodiments, it is apparent that various changes may be made in the embodiments without departing from the spirit and the scope of the invention, as defined by the appended claims.

What is claimed is:

1. A synchronous processing circuit for a vibratory rotational-rate sensor, wherein the sensor provides an analog sense signal representing rotational rate about a first axis and an analog vibratory signal in response to motion of a vibrating mass, and an analog-to-digital converter coupled to integrate the sense signal over an interval synchronized to the vibratory signal, the circuit further comprising: a programmable digital accumulator for accumulating a programmable number of digital samples from the analog-to-digital converter, the accumulation of the programmable number of digital samples allowing the sensor to have a flexible response time.

2. A synchronous processing circuit for a vibratory rotational-rate sensor as in claim 1 wherein the accumulator averages the programmable number of digital samples.

3. A synchronous processing circuit for a vibratory rotational-rate sensor as in claim 1 further comprising a prescaler for scaling the input to the accumulator in response to a programmable digital prescaling factor.

4. A synchronous processing circuit for a vibratory rotational-rate sensor as in claim 1 further comprising a prescaler for scaling the input to the accumulator in response to the programmable number.

5. A synchronous processing circuit for a vibratory rotational-rate sensor as in claim 1, wherein the sensor includes an assembly isolated from external vibrations, the sensor further comprising a digital register on the assembly for storing the programmable number.

6. A synchronous processing circuit for a vibratory rotational-rate sensor as in claim 1 further comprising a scaler for scaling the output of the accumulator in response to a programmable digital scaling factor.

7. A synchronous processing circuit for a vibratory rotational-rate sensor as in claim comprising a first digital register on the assembly for storing the programmable number and a second digital register on the assembly for storing the digital scaling factor.

8. A method for processing signals from a vibratory rotational-rate sensor, wherein the sensor provides an analog sense signal representing rotational rate about a first axis and an analog vibratory signal in response to motion of a vibrating mass, and an analog-to-digital converter coupled to integrate the sense signal over an interval synchronized to the vibratory signal, the method further comprising the step of:

programming a number of digital samples to be accumulated from the analog-to-digital converter, the programmable number of digital samples allowing the sensor to have a flexible response time;

accumulating the programmed number of digital samples from the analog-to-digital converter; and writing the accumulated digital samples to a memory.

9. A method for processing signals from a vibratory rotational-rate sensor as in claim 8, further comprising the step of averaging the programmable number of digital samples.

10. A method for processing signals from a vibratory rotational-rate sensor as in claim 8, further comprising the step of scaling the input to the step of accumulating in response to a programmable digital prescaling factor.

11. A method for processing signals from a vibratory rotational-rate sensor as in claim 8, further comprising the step of scaling the input to the step of accumulating in response to the programmable number.

12. A method for processing signals from a vibratory rotational-rate sensor as in claim 8, wherein the sensor includes an assembly isolated from external vibrations, the method further comprising the step of storing the programmable number in a digital register on the assembly.

13. A method for processing signals from a vibratory rotational-rate sensor as in claim 8 further comprising the step of scaling the output of the accumulating step in response to a programmable digital scaling factor.

14. A method for processing signals from a vibratory rotational-rate sensor as in claim 13, wherein the sensor includes an assembly isolated from external vibrations, the method further comprising the steps of storing the programmable number in a first digital register on the assembly for and storing the digital scaling factor in a second digital register on the assembly.

* * * * *